United States Patent
Salice

(10) Patent No.: US 7,207,087 B2
(45) Date of Patent: Apr. 24, 2007

(54) DEVICE FOR DAMPING THE MOVEMENT OF MOVABLE FURNITURE PARTS IN THEIR CLOSING REGION

(75) Inventor: Luciano Salice, Carimate (IT)

(73) Assignee: Arturo Salice S.p.A., Novedrate (Como) (IT)

( * ) Notice: Subject to any disclaimer, the term of this patent is extended or adjusted under 35 U.S.C. 154(b) by 125 days.

(21) Appl. No.: 10/780,000

(22) Filed: Feb. 17, 2004

(65) Prior Publication Data

US 2004/0227439 A1    Nov. 18, 2004

(30) Foreign Application Priority Data

Feb. 17, 2003   (DE) ................ 203 02 524 U

(51) Int. Cl.
*E05D 11/06* (2006.01)
*A47B 88/00* (2006.01)

(52) U.S. Cl. .................... 16/374; 312/333

(58) Field of Classification Search ............ 16/354, 16/82, 50, 64, 62, DIG. 9, 79, 298, 317, 319, 16/343, 374–376, DIG. 17; 312/333, 351.9; 49/341, 348; 188/290, 291

See application file for complete search history.

(56) References Cited

U.S. PATENT DOCUMENTS

| 1,899,266 | A |   | 2/1933 | Foster | |
|---|---|---|---|---|---|
| 2,078,815 | A | * | 4/1937 | Segar | 16/286 |
| 2,516,935 | A | * | 8/1950 | Weaver | 16/50 |
| 3,916,481 | A | * | 11/1975 | Pittasch | 16/245 |
| 4,411,046 | A | * | 10/1983 | Nawrath | 16/354 |
| 4,536,918 | A | * | 8/1985 | Brockhaus | 16/308 |
| 4,727,622 | A | * | 3/1988 | Tsuneki | 16/368 |
| 4,872,239 | A | * | 10/1989 | Ferguson et al. | 16/64 |
| 4,979,265 | A | * | 12/1990 | Grass | 16/291 |
| 5,040,857 | A | * | 8/1991 | Mandel et al. | 312/405 |
| 5,269,048 | A | * | 12/1993 | Pazmany | 16/354 |
| 5,309,676 | A | * | 5/1994 | Appelmann et al. | 49/253 |
| 5,676,222 | A | * | 10/1997 | Wu | 185/39 |
| 5,762,412 | A | * | 6/1998 | Kim | 312/319.2 |
| 6,205,617 | B1 | * | 3/2001 | Held et al. | 16/246 |
| 6,408,483 | B1 | * | 6/2002 | Salice | 16/85 |
| 6,473,936 | B2 |   | 11/2002 | Orita | |
| 6,591,454 | B2 | * | 7/2003 | Brustle | 16/374 |
| 6,666,306 | B2 | * | 12/2003 | Gasser | 188/82.1 |
| 6,681,525 | B1 | * | 1/2004 | Dudley | 49/358 |

(Continued)

FOREIGN PATENT DOCUMENTS

AT    004817    11/2001

(Continued)

*Primary Examiner*—Robert J. Sandy
*Assistant Examiner*—Andre L. Jackson
(74) *Attorney, Agent, or Firm*—Dilworth & Barrese, LLP

(57) ABSTRACT

A device for damping the movement of movable furniture parts to their closed position provides for a housing which can be fastened to a fixed wall part or carcass part, in which housing a lever is pivotably held or a plunger is slidably guided, with said lever or plunger being pivoted or slid to its closing region by the movable furniture part, thus by way of at least a two-stage gear mechanism with a speed increasing ratio impinging on a rotation damper or on the piston of a damping cylinder.

11 Claims, 3 Drawing Sheets

U.S. PATENT DOCUMENTS

| | | | |
|---|---|---|---|
| 6,910,557 B2 * | 6/2005 | Doornbos et al. | 188/290 |
| 7,127,778 B2 * | 10/2006 | Salice | 16/354 |
| 2004/0093693 A1 * | 5/2004 | Salice | 16/354 |
| 2004/0205935 A1 * | 10/2004 | Lautenschlaeger et al. | 16/374 |
| 2006/0026792 A1 * | 2/2006 | Brustle et al. | 16/54 |

FOREIGN PATENT DOCUMENTS

| | | |
|---|---|---|
| CN | 2168935 Y | 6/1994 |
| CN | 1260438 A | 7/2000 |
| DE | 4319678 | 12/1993 |
| JP | 2001049937 A * | 2/2001 |
| JP | 2002-181103 | 6/2002 |
| WO | 01/60194 | 8/2001 |

* cited by examiner

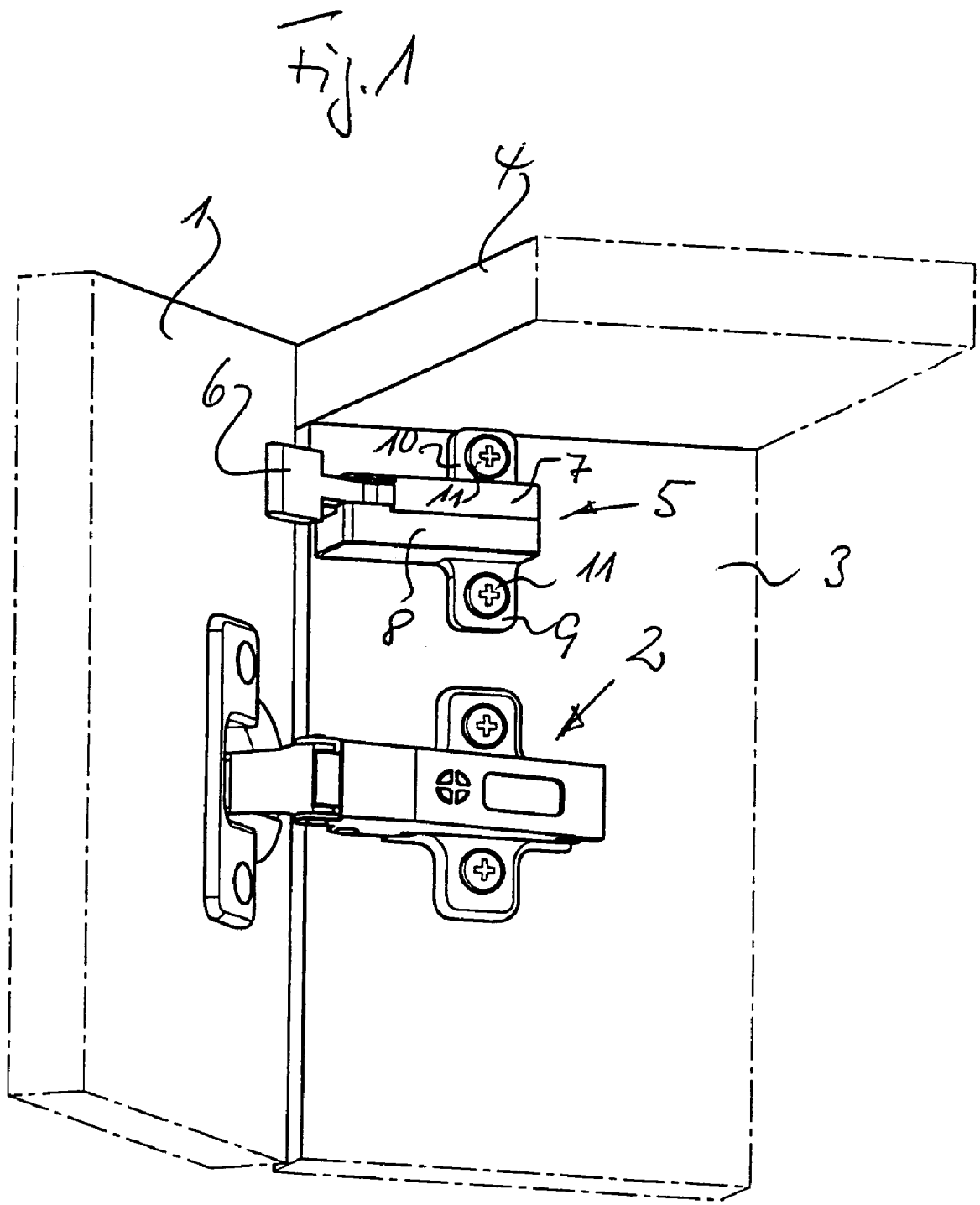

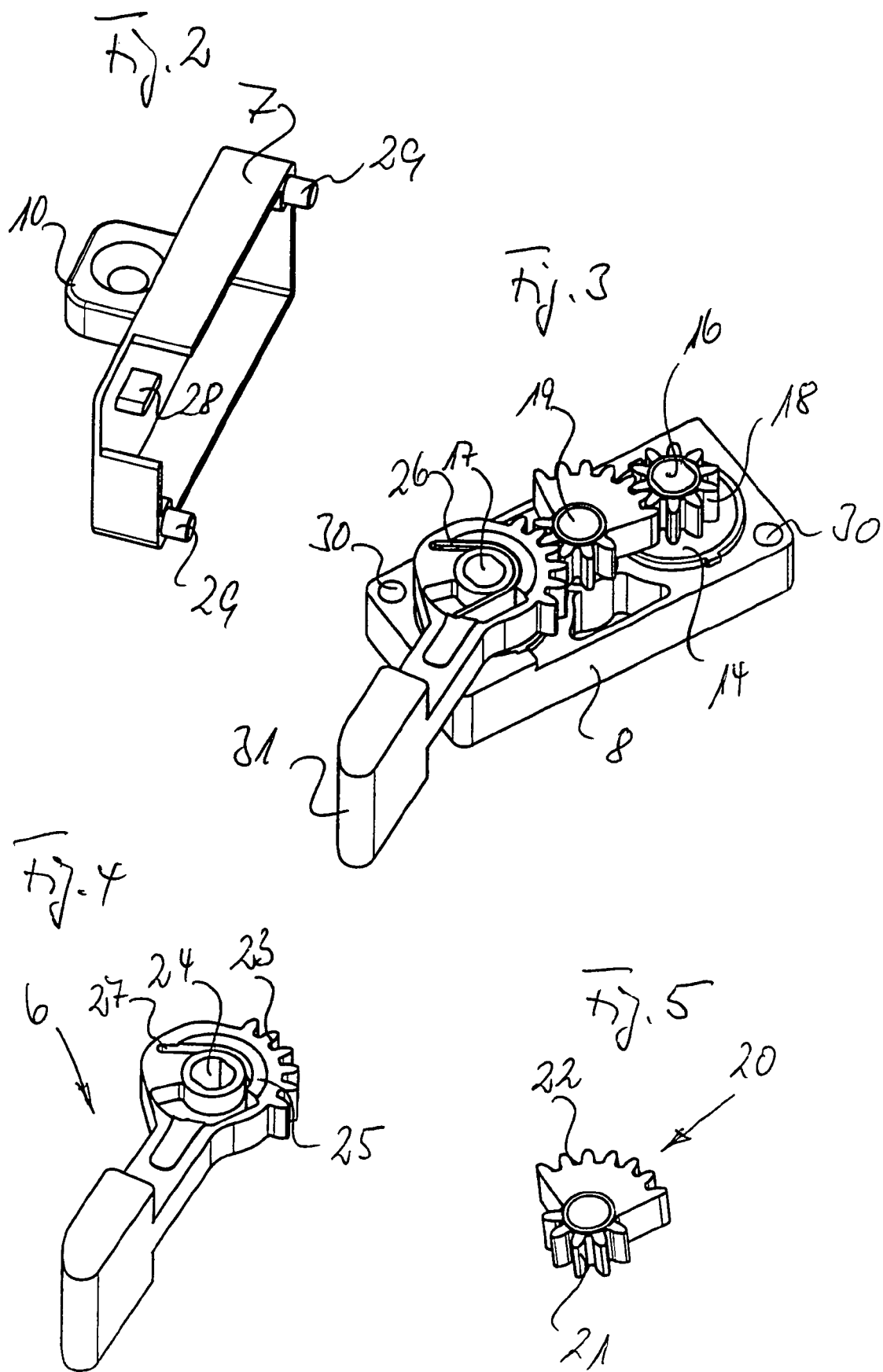

DEVICE FOR DAMPING THE MOVEMENT OF MOVABLE FURNITURE PARTS IN THEIR CLOSING REGION

BACKGROUND OF THE INVENTION

The invention relates to a device for damping the movement of movable furniture parts in their closing region, preferably for damping the closing movement of doors, flaps or drawers.

Devices of this type are used for decelerating movable furniture parts, for example doors, flaps or drawers, during vigorous movement into their closed position so as to reduce noise when they come to rest against carcass parts of items of furniture or fixed parts, and so as to reduce impact loads. In known devices of this type, the damping devices which are used for damping or decelerating the furniture parts are impinged upon along only a relatively small path in the closing region of the movable furniture parts so that they are only able to provide a correspondingly modest damping or deceleration action.

SUMMARY OF THE INVENTION

It is thus the object of the invention to create a device of the type mentioned in the introduction which causes strong deceleration and damping also during the relatively small closing movement of the furniture parts.

According to the invention, this object is met by a housing which can be fastened to a fixed wall part or carcass part, in which housing a lever is pivotably held or a plunger is slidably guided, with said lever or plunger being pivoted or slid to its closing region by the movable furniture part, thus by way of at least two-stage gear means with a speed increasing ratio impinging on a rotation damper or on the piston of a damping cylinder. By means of the gear means provided according to the invention, the relatively small closing movement of the movable furniture parts, which movement can be a pivotal movement or a translatory movement, is reduced such that said movement results in an increased rotation of the damping member of the rotation damper or an increased movement of the piston of a damping cylinder.

One embodiment of the invention provides for the lever, which is held in the housing, to carry a toothed segment concentrically to its bearing axis, with said toothed segment intermeshing with a pinion which is held in the housing, which pinion interacts with a toothed wheel which is attached to the front-end journal of the rotation damper. In this way, with the use of a two-stage gear arrangement, it is possible to transmit from the damping lever a much increased rotary angle, when compared to the pivot angle of said damping lever, to the rotor of the rotation damper, which rotor causes damping.

A preferred embodiment provides for the pinion to comprise two toothed segments, of which one segment of smaller radius intermeshes with the toothed segment of the lever, while the toothed segment of the pinion of larger radius intermeshes with the toothed wheel of the rotor of the rotation damper.

A further preferred embodiment provides for the lever which is used for damping to be attached to a journal which is the front-end journal of a second rotation damper which is held in the housing. With this embodiment, the damping effect can be further increased. However, the second rotation damper can be done without, if, due to the given speed ratio, the damping effect of the first rotation damper is sufficient.

Expediently, the lever is impinged upon in the opening direction by a spring, so that after moving the movable furniture part into the opening position, the spring pivots the damping lever into its standby position. In order to achieve as fast a movement as possible of the damping lever when it moves into its standby position, the rotation damper or dampers offers/offer less resistance in the opening direction than in the closing direction.

BRIEF DESCRIPTION OF THE DRAWINGS

Below, one embodiment of the invention is explained in more detail by means of the drawing which shows the following:

FIG. 1: a perspective view of a damping device according to the invention, whose housing is attached to a side wall of a cabinet, and whose damping lever dampens the closing movement of the door in the closing region;

FIG. 2: the cover of the housing of the damping device in perspective view;

FIG. 3: the installation component of the housing in perspective view;

FIG. 4: a perspective view of the damping lever;

FIG. 5: a perspective view of the pinion with two tooth segments of different radii;

DESCRIPTION OF THE PREFERRED EMBODIMENTS

Figure 6:
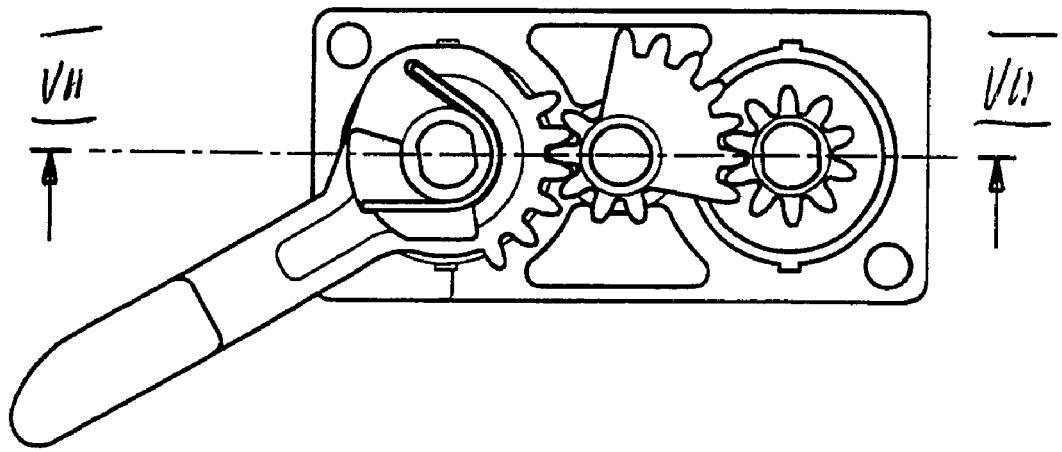
FIG. 6: a top view of the installation component of the housing according to FIG. 3.
Figure 7:
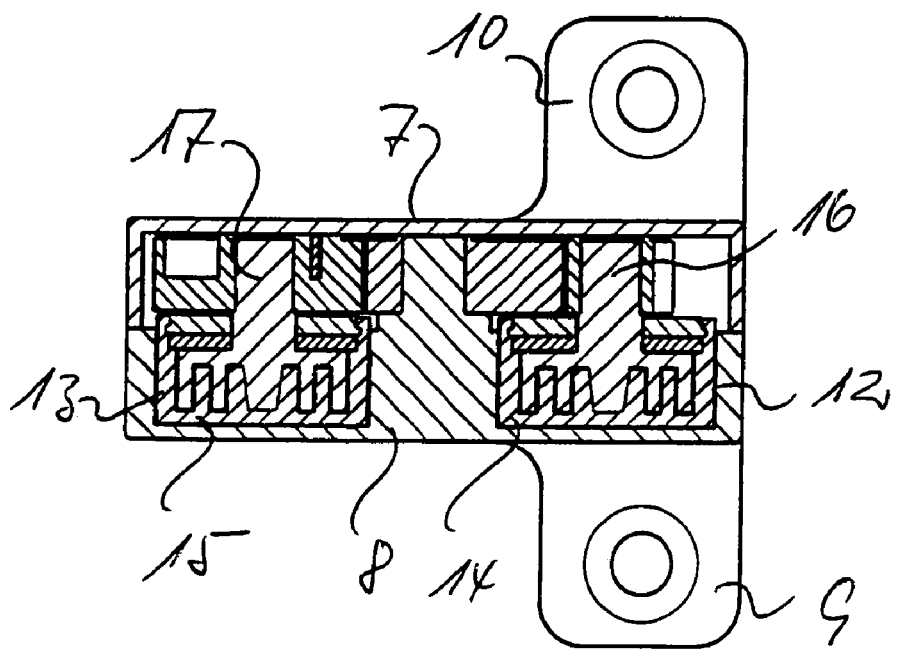
FIG. 7: a section of the installation component along the line VII—VII shown in FIG. 6.

FIG. 1 shows the upper left corner region of a cabinet whose door 1, which is in the opening position, is connected to a side wall 3 of the cabinet by means of the usual double swinging-arm hinges 2. Immediately below the cover wall 4 of the cabinet, the damping device 5 is attached as shown, with the damping lever 6 of said damping device 5 protruding beyond the opening side of the cabinet carcass such that it provides dampening and deceleration action on the door 1 only in the closing region of the door 1. The housing of the damping device 5 comprises two housing halves 7, 8 which in the attachment plane comprise wing-like extended parts 9, 10. The extended parts 9, 10 comprise attachment boreholes through which the attachment screws 11 reach for connection to the cabinet wall 3.

As shown in FIG. 3, the housing half 8 forms the installation component of the damping device. The installation component 8 comprises two blind boreholes 12, 13 in which the housings of the rotation dampers 14, 15 are inserted and held in a torsionally rigid manner. The rotation dampers 14, 15 are of the usual known design and are thus not described in detail. The housings of the rotation dampers are covered by covers which accommodate the journals 16, 17 of the rotors of the rotation dampers. The journal 17 of the rotation damper 15 carries the damping lever 6 in a torsionally rigid manner. The journal 16 of the rotation damper 14 carries a toothed wheel 18 in a torsionally rigid manner. Between the rotation dampers 14, 15, on a journal 19 of the installation component 8, a pinion 20 is held so as to be freely rotatable, with said pinion 20 comprising two toothed segments which are opposed to each other, of which segments the toothed segment 21 is of a smaller radius while the toothed segment 22 is of a larger radius. The toothed segment 22 intermeshes with the toothed wheel 18 of the rotation damper 14. The toothed segment 21 of smaller radius intermeshes with a tooth segment 23 which is arranged on the damping lever 6 concentrically to the pivot axis. The damping lever 6 comprises a recess 25 which partially encompasses the bearing borehole 24 of the damping lever 6 in which recess 25 a limb spring 26 is held. For the purpose of being held in place, as shown in FIG. 3, the upper end of the limb spring 26 engages a slot 27 in the upper end region of the recess 25. The lower region of the recess 25 comprises a wide part, as shown, which wide part is engaged by an abutment 28 after the housing has been closed by placing the housing part 7 onto the installation component 8, wherein said abutment 28 is attached to the upper side wall of the housing cover 7 as shown in FIG. 2. This bridge-shaped abutment 28 is used for supporting the other limb of the limb spring 26 so that in the opening position of the door the damping lever 6 is swivelled from its pivoted-in position into its pivoted-out standby position.

On diagonally opposed regions, the housing part 7 comprises attachment journals 29 which during joining and closing the housing engage boreholes 30 of the installation component 8. To ensure a more gentle action on the inside of the cupboard door 1, the damping lever 6 comprises a widened activation part 31.

The invention claimed is:

1. A device for damping the movement of movable furniture parts in their closing region, preferably for damping the closing movement of doors, flaps or drawers, comprising:
 a housing (7, 8) which can be fastened to a fixed wall part or carcass part (3), in which housing (7,8) a lever (6) is pivotably held or a plunger is slidably guided, with said lever or plunger being pivoted or slid to its closing region by the movable furniture part (1), thus by way of at least two stage gear means with a speed increasing ratio impinging on a rotation damper (14, 15) or on a piston of a damping cylinder;
 wherein the lever (6), which is held in the housing (7, 8), carries a toothed segment (23) concentrically to its bearing axis (17), with said toothed segment intermeshing with a pinion (20) which is held in the housing, which pinion interacts with a toothed wheel (18) which is attached to a front-end journal (16) of the rotation damper (14), and
 the pinion (20) comprises two toothed segments (21, 22), of which one segment (21) of smaller radius intermeshes with the toothed segment (23) of the lever (6), while the toothed segment (22) of the pinion (20) of larger radius intermeshes with the toothed wheel (18) of the rotation damper (14).

2. The device according to claim 1, wherein the lever (6) is impinged upon in the opening direction by a spring (26).

3. The device according to claim 2, wherein the rotation damper or dampers (14, 15) offers/offer less resistance in the opening direction than in the closing direction.

4. The device according to claim 1, wherein the lever (6) which is used for damping is attached to a journal (17) which is the front-end journal of a second rotation damper (15) which is held in the housing.

5. The device according to claim 4, wherein the lever (6) is impinged upon in the opening direction by a spring (26).

6. The device according to claim 5, wherein the rotation damper or dampers (14, 15) offers/offer less resistance in the opening direction than in the closing direction.

7. A device for damping the closing movement of movable furniture parts in their closing region comprising:
 a housing (7, 8) which can be fastened to a fixed wall part or body part (3), in which housing (7, 8) a lever (6) is pivotably held, with said lever being pivoted to its closing region in response to closing movement of a movable furniture part (1) by way of at least two stage gear means with a speed increasing ratio impinging on a rotation damper (14, 15), and
 a rotatably mounted pinion having a large radius toothed segment (22) and a small radius toothed segment (21), wherein the large radius toothed segment (22) intermeshes with a toothed wheel (18) cooperatively associated with the rotation damper (14) of the rotation damper, and the small radius toothed segment (21) intermeshes with a toothed segment (23) of the lever (6).

8. An article of furniture comprising:
 a body,
 a panel attached to the body which is movable between an open and closed position,
 a damping device attached to a wall of the body for damping the closing movement of the panel, said damping device including a housing (7, 8) enclosing a pivotably mounted lever (6), said lever being pivoted to a closing region in response to closing movement of the panel by way of at least two stage gear means with a speed increasing ratio impinging on a rotation damper (14, 15), wherein
 the damping device further includes a rotatably mounted pinion having a large radius toothed segment (22) and a small radius toothed segment (21), wherein the large radius toothed segment (22) intermeshes with a toothed wheel (18) cooperatively associated with the rotation damper (14), and the small radius toothed segment (21) intermeshes with a toothed segment (23) of the lever (6).

9. A device for damping the movement of movable furniture parts in their closing region, preferably for damping closing movement of doors, flaps or drawers, comprising
 a housing (7, 8) structured and arranged to be fastened to a fixed wall part or carcass part (3),
 a lever (6) pivotably held or plunger slidably guided in said housing (7, 8),
 said lever or plunger arranged to be pivoted or slid to its closing region by the movable furniture part (1) and means for damping the closing movement comprising an at least two stage gear means having a speed increasing ratio and impinging on a rotation damper (14, 15) or piston of a damping cylinder, wherein
 the lever (6), which is held in the housing (7, 8), carries a toothed segment (23) concentrically to its bearing axis (17), with said toothed segment intermeshing with a pinion (20) which is held in the housing, which pinion interacts with a toothed wheel (18) which is attached to a front-end journal (16) of the rotation damper (14), and
 the lever (6) which is used for damping is attached to a journal (17) which is a front-end journal of a second rotation damper (15) which is held in the housing.

10. The device according to claim 9, wherein the lever (6) is impinged upon in the opening direction by a spring (26).

11. The device according to claim 10, wherein the rotation damper or dampers (14, 15) offers/offer less resistance in the opening direction than in the closing direction.

* * * * *